No. 629,675. Patented July 25, 1899.
J. D. FOX.
ANIMAL PEN OR TRAP.
(Application filed Mar. 29, 1899.)

(No Model.)

WITNESSES: L. Almquist

INVENTOR J. D. Fox.
ATTORNEYS.

UNITED STATES PATENT OFFICE.

JOSHUA D. FOX, OF FRANKFORT, INDIANA.

ANIMAL PEN OR TRAP.

SPECIFICATION forming part of Letters Patent No. 629,675, dated July 25, 1899.

Application filed March 29, 1899. Serial No. 710,928. (No model.)

*To all whom it may concern:*

Be it known that I, JOSHUA D. FOX, of Frankfort, in the county of Clinton and State of Indiana, have invented a new and Improved Animal Pen or Trap, of which the following is a full, clear, and exact description.

The object of the invention is to provide a new and improved pen or trap for temporarily holding animals—such as cattle, for instance—for conveniently dehorning them or to hold hogs for placing rings in their snouts, the device being simple and durable in construction and arranged to permit of readily driving the animal into the trap and to then securely hold the head of the animal in position while performing the operation.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
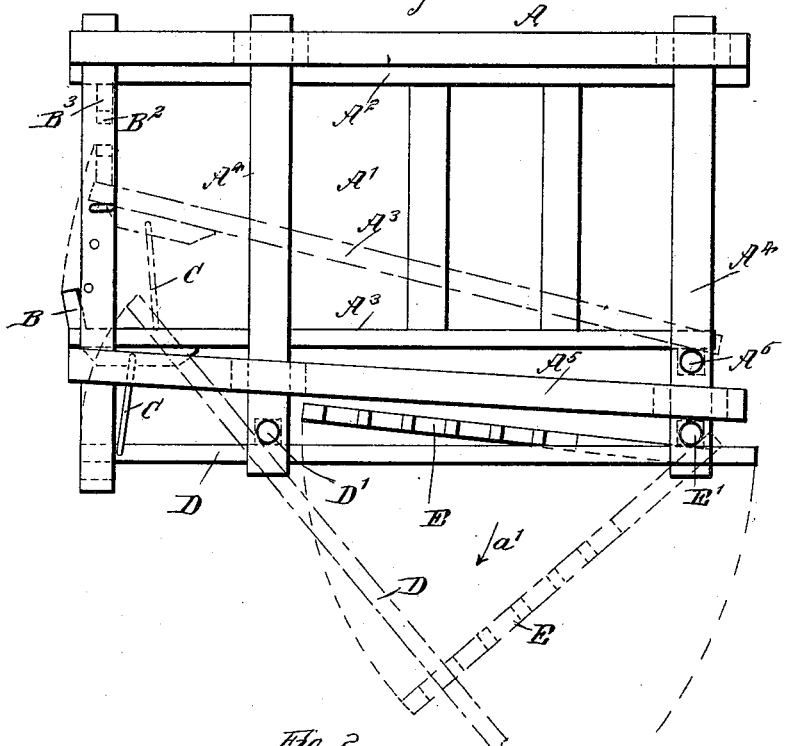
Figure 2:
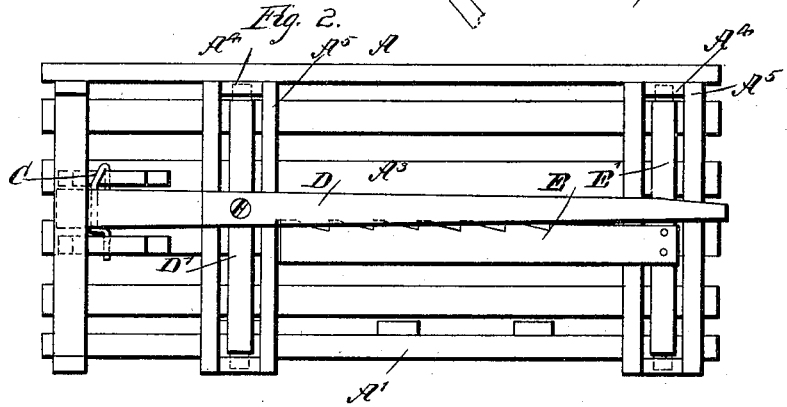
Figure 3:
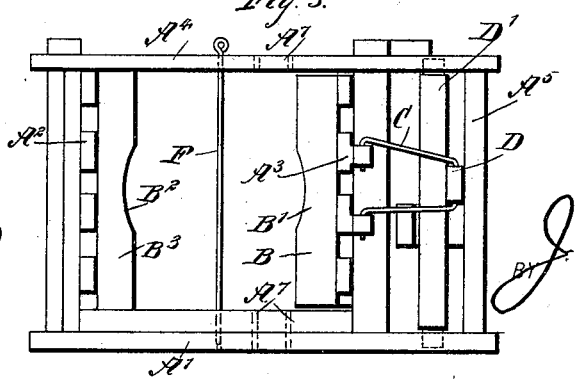

Figure 1 is a plan view of the improvement. Fig. 2 is a side elevation of the same, and Fig. 3 is a front end elevation of the same.

The improved animal trap or pen is provided with a box or cage A, having a bottom A', a fixed side $A^2$, and a movable side $A^3$, and has transverse bars or beams $A^4$ extending from the fixed side $A^2$ over the movable side $A^3$ to connect with a skeleton framework $A^5$, arranged outside of the movable side $A^3$, as is plainly indicated in the drawings. The rear end of the box or cage is open, and the pivot $A^6$ for the movable side is at or near the rear end, and the forward end of the box or cage is also normally open, but is adapted to be closed by swinging the movable side $A^3$ inward, as indicated in dotted lines in Fig. 1.

On the forward end of the side $A^3$ is arranged a neck-post B, formed with a recess B', located directly opposite a similar recess $B^2$ in a second post $B^3$, arranged at the forward end of the fixed side $A^2$, so that when said side $A^3$ is swung inward the two posts B and $B^3$ operate in conjunction with each other to engage and hold the neck of the animal in the recesses B' $B^2$ to allow the desired operation on the animal. The outer end of the movable or pivoted side $A^3$ is connected by a link C with a lever D, fulcrumed at D' on the skeleton frame $A^5$, and the outer end of said lever is adapted to be engaged by a notched bar E, fulcrumed at E' on the skeleton framework in front of the pivot $A^6$ for the side $A^3$.

When the lever D receives a swinging motion in the direction of the arrow $a'$, then the forward end of the lever causes the link C to impart an inward-swinging motion to the side $A^3$ to narrow the interior of the box or cage, so that the animal driven in at the rear open end can be readily driven forward in the box until its head passes through the recesses B' $B^2$ to allow the operator to clamp the neck in place between the posts, as previously mentioned. When the lever D has moved the side $A^3$ into the desired position, said side is locked in place by the notched bar E and, if desired, by a pin F, extending through registering apertures $A^7$, arranged in the forward top bar $A^4$ and the bottom A', as indicated in Figs. 2 and 3. After the operation is performed the operator unlocks the side $A^3$ by removing the pin F and then swings the notched bar E out of engagement with the lever D to allow of swinging the lever in the inverse direction of the arrow $a'$, and thus swing the side $A^3$ outward and release the animal. The latter can then pass out of the box or cage either at the forward or rear end thereof.

The device is very simple and durable in construction, will not easily get out of order, can be cheaply manufactured, and is easily manipulated.

Having thus fully described my invention, I claim as new and desire to secure by Letters Patent—

1. An animal pen or trap comprising a cage having an entrance-opening at the rear end, a panel pivoted at its rear end and forming a swinging side ranging longitudinally of the pen, the said panel being movable to assume an inclined position and thus contract the interior of the cage toward the front end, the front end of said longitudinally-ranging swinging member forming a holding member for the neck of an animal, and a second neck-holding member coacting with the said front end of the longitudinally-ranging member to grip the animal.

2. An animal pen or trap, comprising a cage open at both ends and having one of its sides pivoted at the rear or entrance end of the cage, a neck-post secured to the fixed side at the forward end of the cage, a similar neck-post being on the free end of the said pivoted side to operate in conjunction with the said fixed neck-post, a link pivotally connected with the forward end of said pivoted side, a lever pivotally connected with said link, and a pivoted notched bar adapted to engage the outer end of said lever, to lock the latter against swinging, substantially as shown and described.

3. An animal pen or trap, comprising a cage open at both ends and having one of its sides pivoted at the rear or entrance end of the cage, a neck-post secured to the fixed side at the forward end of the cage, a similar neck-post being on the free end of the said pivoted side to operate in conjunction with the said fixed neck-post, a link pivotally connected with the forward end of said pivoted side, a lever pivotally connected with said link, and a locking-pin removably held on the front end of the cage, to lock the swinging side against accidental opening, substantially as shown and described.

4. An animal pen or trap comprising a cage having neck-holding members, one of said members being carried by a side of the pen, said side being fulcrumed at or near its rear end to swing inward, an operating-lever for said side, and a locking-bar pivoted adjacent to the movable side to swing outward and having means for engaging the said lever to hold the movable side in its inward position.

JOSHUA D. FOX.

Witnesses:
WILLIAM A. KISSINGER,
OWEN E. BRUMBAUGH.